United States Patent

Bynum, Jr. et al.

[11] 3,707,901
[45] Jan. 2, 1973

[54] PAVEMENT AND COMPOSITION THEREFOR

[75] Inventors: Douglas Bynum, Jr., College Station; Bob M. Gallaway, Bryan, both of Tex.

[73] Assignee: U. S. Rubber Reclaiming Co., Inc., Vicksburg, Mich.

[22] Filed: Dec. 22, 1970

[21] Appl. No.: 100,661

[52] U.S. Cl. ............................................. 94/9, 94/23
[51] Int. Cl. .......................................... E01c 7/18
[58] Field of Search ............ 94/7, 9, 10, 19 R, 22, 23; 106/277, 283

[56] References Cited

UNITED STATES PATENTS

| | | | |
|---|---|---|---|
| 3,603,221 | 9/1971 | Barton | 94/7 X |
| 3,253,521 | 5/1966 | Endres | 94/23 |
| 3,110,604 | 11/1963 | McConnaughay | 106/283 X |
| 2,871,774 | 2/1959 | Johnson | 94/19 UX |
| 2,863,841 | 12/1958 | Bernier | 94/19 UX |
| 2,700,655 | 1/1955 | Endres | 260/28.5 |

FOREIGN PATENTS OR APPLICATIONS

| | | | |
|---|---|---|---|
| 410,563 | 5/1934 | Great Britain | 94/19 R |
| 414,767 | 8/1934 | Great Britain | 94/7 |

Primary Examiner—Nile C. Byers, Jr.
Attorney—Robert Irving Williams

[57] ABSTRACT

Pavement having an inner layer between a surface course and a base, and a composition therefor. The inner layer may comprise ground tire stock or other particulate vulcanized rubber together with sand or other fine material aggregate, and, as a binder, asphalt from an oil-in-water asphalt emulsion which may be about 65 percent asphalt. A typical composition may contain equal parts by volume of mineral aggregate and particulate vulcanized rubber, and asphalt emulsion in an amount of 20 to 40 percent of the total volume. The layer, which may be from about one-eighth to one-half inch in thickness, will serve to relieve strain in the surface course and to arrest cracking thereof, by virtue of its reduced elastic modulus. In addition, it will desirably fill cracks in the base, and protect the base.

4 Claims, 2 Drawing Figures

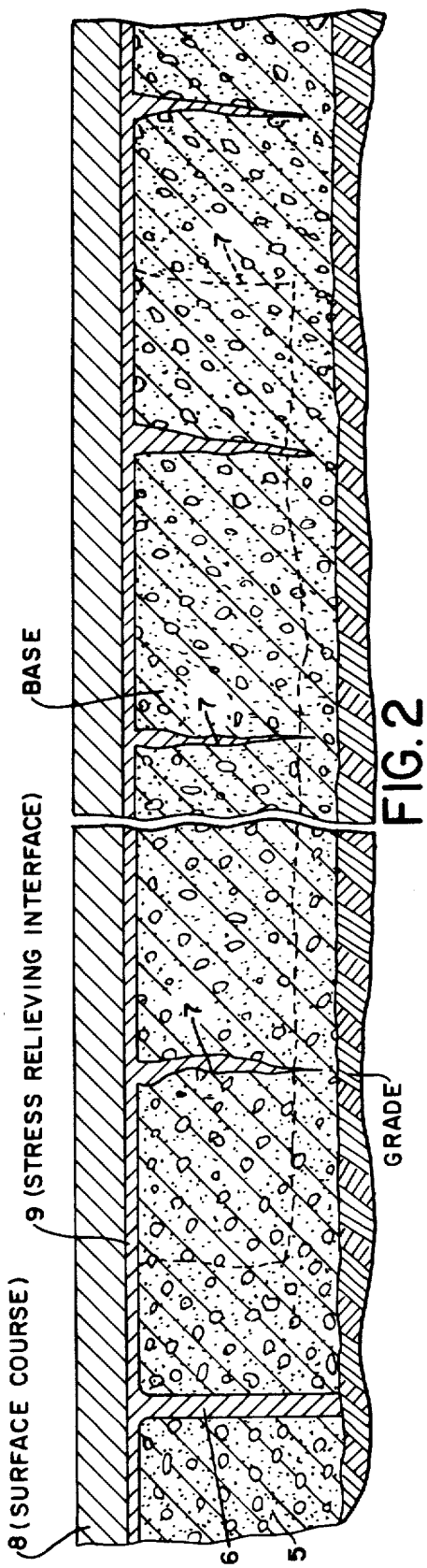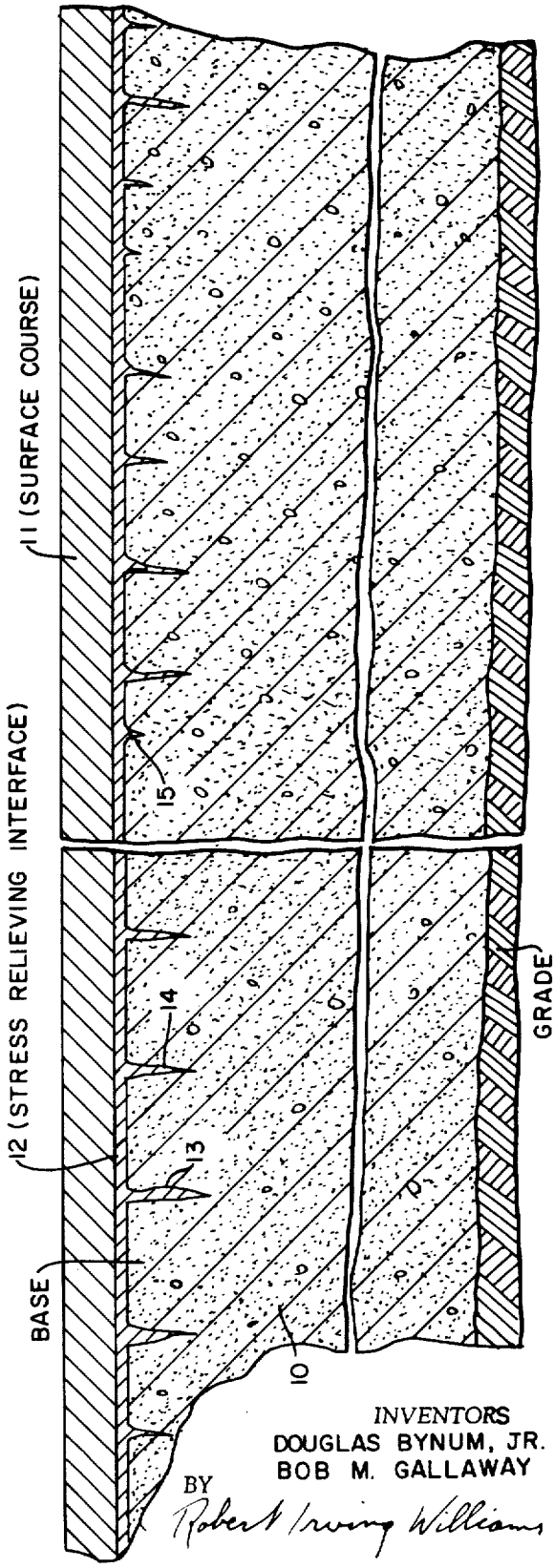

PAVEMENT AND COMPOSITION THEREFOR

BACKGROUND OF THE INVENTION

Surface layers of asphalt and other materials employed on roadways and like pavements tend to crack and deteriorate due to temperature and/or traffic stresses in the surface layer, and pressures on the underside thereof from the base, and both the surface layer and the base tend to crack or deteriorate due to various strains transmitted between the surface layer and the base and to various factors affecting one or the other thereof under a wide variety of environmental conditions and differentials in the properties of the materials of which the surface and base layers are composed.

Various inner layers including sand and sawdust have previously been utilized between bases such as cement concrete, large aggregate, and old pavement, and surface layers formed of brick or of various types of concrete, but none of them have proved satisfactory under modern conditions of wide environmental differences and heavy traffic. In addition, they have lacked many of the desiderata for asphalt concrete surfaces.

SUMMARY OF THE INVENTION

With the foregoing and other considerations in view, the present invention contemplates the provision of an inner layer of from ground vulcanized rubber, fine mineral aggregate, and asphalt emulsion (or other suitable form of Bituminous cement) or similar viscoelastic binder, whereby: (1) The strain in the surface course due to changes of environmental conditions will be reduced due to the extensibility of this formulation; (2) the layer will serve to arrest cracks emanating from the base course due to the high elongation of this inner layer; and (3) the layer will protect the base and serve as a moisture barrier for the case of cracked surface courses or other types of moisture penetration.

The extensibility of the proposed formulation of ground rubber, mineral aggregate and asphalt cement is 600 to 1,200 percent of that of regularly used all weather flexible pavements such as bituminous concrete mixtures. The foundation or base can swell 200 to 500 percent more with a one-fourth inch thickness of the interface material without causing cracks in the surface course compared to the same pavement system without the interface material.

The high binder and rubber content of the mixture is unique in that the formulation so formed permits this mixture to react viscoelastically when subjected to low rates of strain and yet at high rates of strain the formulation performs elastically. The mixture begins to lose the desired effect when the rubber content is less than about 30 percent of the total mixture, and excess void content for certain purposes was found when the rubber content was greater than about 60 percent of the total mixture.

Transmitted strains in the surface and under layers of a layered pavement system which contain as an intermediate layer the composition of the invention are rendered harmless. Thus, those strains caused by environmental changes are ineffective as destructors of the pavement.

Stress relieving interface layers one-fourth inch thick provide greatly increased improvement in pavements, and increase in thickness to one-half inch, and possibly more, given even better, though not proportionately better, results. Layers as thin as one-eighth inch may also be used to advantage.

The base may be an old pavement course, a rolled stabilized aggregate, or other suitable type of base material on which the inner layer may be applied, and the overlying surface is commonly bituminous concrete 1 ½ to 2 inches thick but may be other suitable types of similar surfacing materials presenting similar problems.

If an old pavement course of cement-concrete provides the base, it may be 6 to 8 inches thick, and it will have old joints; and it is desirably broken up to provide cracks every 2 to 5 feet and then rolled. And cracks are often present and/or may be intentionally formed in old asphalt-concrete pavements (6 to 8 inches thick, for example), and, indeed, in new pavement bases which may be 6 to 14 inches thick and which may be formed of an aggregate,— for instance soil, sand, shells, pebbles, or crushed rock, — stabilized with cement. In such cases the base tends to anchor the stress relieving layer and to close the joints and/or cracks. In such instances also the base may be rolled before the application of the stress relieving layer.

THE DRAWING

FIG. 1 shows in cross-section one type of pavement embodying the invention; and

FIG. 2 shows in cross-section another type of pavement embodying the invention.

SPECIFIC DISCLOSURE

The particular pavement shown in FIG. 1 comprises a base 5 of old cement concrete having joints 6 and cracks 7 therein, a surface layer 8, and an interface layer 9 of a composition embodying the invention.

The pavement shown in FIG. 2 comprises a base 10 of rolled stabilized aggregate, a surface layer 11 of asphaltic concrete, and an interface layer 12 of a composition embodying the invention. The base contains cracks 13, 14, and 15 into which the interface layer has penetrated.

The composition may be formed by mixing ground vehicle tires and sand or other fine mineral aggregate together, and then adding an oil-in-water emulsion which may be between 55 and 70 percent residual asphalt cement in 30 to 45 percent water by volume. The amount of ground vulcanized rubbery material in the composition may be from 30 to 60 percent of the composition by volume, and of sand or like mineral aggregate between 20 and 50 percent. The size of the rubbery material may run from 3/16 inch to 50-mesh and the size of the aggregate from one-eighth inch to 50-mesh. The tar or asphalt content may vary from 15 to 40 percent of the total volume, and may be provided in suitable forms.

Excellent results have been achieved through the use, together with 20 to 40 percent of asphalt emulsion, of equal amounts by volume of ground tire stock and sand of the following size count:

| Sieve Size | Volume, Percent Passing Particulate, Vulcanized |
| --- | --- |

| (U.S. Sieve Numbers) | Rubber | Aggregate |
|---|---|---|
| PAN-200 | 0 | 16 |
| 200-50 | 0 | 13 |
| 50-20 | 0 | 17 |
| 20-16 | 2 | 4 |
| 16-0 | 14 | 2 |
| 10-8 | 5 | 1 |
| 8-4 | 26 | 0 |

In general, there may be employed from 30 to 60 percent of ground vulcanized rubber, from 20 to 50 percent of fine mineral aggregate, and 15 to 35 percent of asphalt, preferably in an emulsion containing from 50 to 70 percent of asphalt and 50 to 30 percent of water or other emulsifying material.

Another highly effective composition is one with a high proportion of particulate crumb rubber, having 40 percent rubber, 35 percent sand, and 25 percent asphaltic emulsion, all by volume.

Another composition with a high proportion of aggregate is 45 percent sand, 35 percent crumb rubber, and 20 percent emulsion.

A composition for use with non-emulsified melted asphalt is 40 percent crumb rubber, 40 percent sand, and 20 percent asphalt by volume.

The amount of added water becomes a variable for different types of aggregate supplied at different moisture contents. Certain additives such as hydrated lime may be required for hydrophilic aggregates.

Other materials which may be employed as aggregate are crushed and sized incinerator waste solids, processed mine tailings, power plant bottom ash, waste rockcrusher fines, crushed waste glass, crushed battery boxes and crushed gravel and stone.

The materials may be mixed in situ or may be carried to the place of use.

Ground tire stock may contain up to 15 percent fiber in certain instances.

Inner layers such as contemplated by the invention are well adapted for use as crack arresters and relievers of the mechanical distress in highway surface courses due to foundation movements and thermal distress due to mismatch of thermal expansion in the base and surface courses.

We claim:

1. A pavement comprising a road base, an outer layer of asphalt concrete, and an inner layer of a mixture of ground vulcanized rubber, fine mineral aggregate, and asphalt as the binder therefor, wherein the inner layer comprises by volume from 30 to 60 percent of ground vulcanized rubber, from 20% to 50% of fine mineral aggregate, and from 15 to 35 percent of asphalt, has a visco-elastic extensibility from 600 to 1,200 percent more than the extensibility of the outer layer, and is visco-elastic at relatively low rates of strain and elastic at relatively high rates of strain.

2. A pavement as in claim 1 wherein the inner layer comprises ground vulcanized rubber substantially 100 percent of which will pass a one-quarter inch screen at least half of which will be retained on a No. 8 screen, and substantially 0 percent of which will pass a No. 50 screen, and fine mineral aggregate substantially 100 percent of which will pass a No. 4 screen.

3. A pavement composition relieving strain and arresting cracks in pavements consisting essentially, by volume, of from 30 to 50 percent of ground vulcanized rubber, from 20 to 40 percent of fine mineral aggregate, and from 15 to 35 percent of residual asphaltic binder from an emulsion, and reacting visco-elastically when subjected to relatively low rates of strain and elastically when subjected to relatively high rates of strain, the ground vulcanized rubber being of a size such that substantially 100 percent thereof will pass a one-quarter inch screen, at least half of which will be retained on a one-eighth inch screen, and substantially none of which will pass a No. 50 screen.

4. A process for forming a pavement which comprises providing, between a base and a surface layer, a substantially continuous strain relieving layer by applying cold to the base, a composition consisting essentially, by volume, of from 30 to 50 parts of ground vulcanized rubber, from 20 to 40 parts of fine mineral aggregate, and from 30 to 70 parts of asphaltic emulsion containing from 15 to 35 parts of residual asphaltic binder, and reacting visco-elastically when subjected to relatively low rates of strain and elastically when subjected to relatively high rates of strain, the ground vulcanized rubber being of a size such that substantially 100% thereof will pass a one-quarter inch screen, at least half of which will be retained on a one-eighth inch screen, and substantially none of which will pass a No. 50 screen.

* * * * *